United States Patent Office 3,355,511
Patented Nov. 28, 1967

3,355,511
FLAME RETARDANT EPOXY COMPOSI-
TIONS CONTAINING POLYGLYCIDYL
ETHERS OF HEXAHALO BICYCLOHEP-
TADIENE BISPHENOLS
Carl G. Schwarzer, Walnut Creek, Calif., assignor to Shell
Oil Company, New York, N.Y., a corporation of
Delaware
No Drawing. Filed Apr. 9, 1965, Ser. No. 447,091
3 Claims. (Cl. 260—830)

ABSTRACT OF THE DISCLOSURE

Flame retardant epoxy resins may be made by combining 10 to 80% by weight of a polyglycidyl ether of hexahalobicycloheptadiene bisphenols with 20 to 90% of a polyglycidyl ether of a polyhydric phenol. In an example, 56 parts of the diglycidyl ether of 2,2-bis(hydroxyphenyl)-4-[(1,4,5,6,7,7-hexachloro bicyclo (2.2.1)-5-heptene-2)] butane and 50 parts of Epon 828 was added 11 parts of m-phenylene diamine followed by curing of the resin.

This invention relates to a flame retardant epoxy resin composition.

It is known that liquid epoxy ethers obtained by reacting polyhydric phenols with halogen containing epoxides or dihalohydrins in the presence of an alkaline medium are useful in the preparation of castings and coating compositions. These epoxy ethers may be cured to form polymers which are very hard and durable and have excellent electrical resistivity and inertness to chemicals. Such polymers are especially useful in the formation of castings or coatings for surfaces which are exposed to moisture, salt water, sunlight, heat, chemicals, etc. However, it has also been found that one drawback in the application of the polyepoxide resins is their susceptibility to burning when exposed to flame thereby inhibiting the widespread use of these materials where there is a possibility of their being ignited.

It is an object of this invention to provide epoxy ethers which are fire retardant. It is also an object of this invention to provide polyepoxides which can be mixed with other polyepoxides, which mixtures may be cured to produce resin compositions which are fire retardant. These and other objects will become apparent and better understood from the following disclosure.

It has now been discovered that a cured epoxy ether resin composition which is nonflammable or self-extinguishing comprises a cured mixture of (1) a flame retardant glycidyl polyether of a halobicycloheptenyl bisphenol and (2) a glycidyl polyether of a polyhydric phenol.

The preferred glycidyl polyethers of a halobicycloheptenyl bisphenol are characterized by the general formula

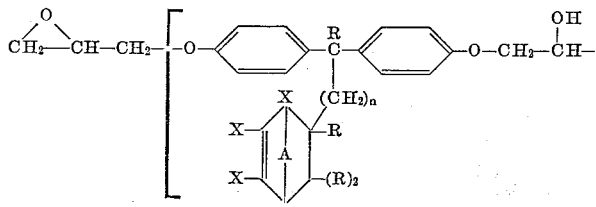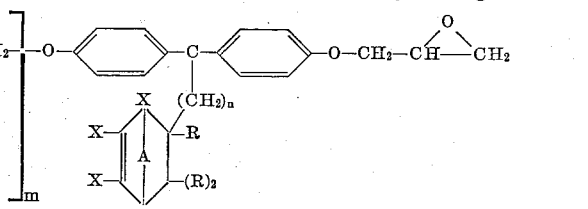

wherein each R is hydrogen or a $C_1$ to $C_4$ alkyl, X is chlorine or bromine, $n$ is an integer from 0 to 6, $m$ is an integer from 0 to 10 and A is selected from $—CX_2—$ and $—CH_2—$. While for any single molecule of the polyether, $m$ is an integer, the polyethers will generally not be a single simple molecule but a complex mixture of glycidyl polyethers where the value of $m$ varies between individual molecules. Those mixtures where the monomer predominates ($m=0$) are preferred.

The novel flame retardant glycidyl polyethers are obtained by reacting a halobicycloheptenyl bisphenol having the formula

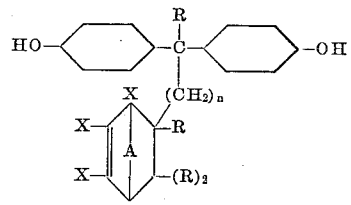

wherein X, R, A and $n$ are as described above, with epoxy forming materials such as halo-epoxy-substituted alkanes, and dihalo-hydroxy-substituted alkanes, preferably in the absence of water. The expression "halo-epoxy-substituted alkanes" as used herein refers to those alkanes having a vic-epoxy group

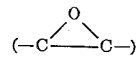

attached directly to halogen bearing carbon atoms. Some examples include epichlorohydrin, epibromohydrin, 1,4-dichloro-2,3-epoxybutane, 1-chloro-2,3-epoxypentane and the like. The expression "dihalohydroxy-substituted alkane" as used herein, refers to those alkanes having a series of three carbon atoms one of which is attached to a halogen atom, the next is attached to a hydroxyl group, and the last attached to a halogen atom, for example, 1,3-dichloro-2-hydroxypropane, 2,4-dibromo-3-hydroxypentane, 2,4-dichloro-3-hydroxybutane, and the like. In either of these two types of reactants, those substituted alkanes containing no more than 12 and preferably from 3 to 8 carbon atoms are used. Epichlorohydrin comes under special consideration because of its low cost and because of the superior properties of the expoxides obtained therefrom.

The amount of bisphenol and epoxy forming material to be employed in the reaction will vary depending on the type of product desired. If a simple monomeric type product is desired (where $m=0$) the bisphenol and epoxy forming material are preferably reacted in chemical equivalent ratios varying from 1:4 to 1:8. If higher molecular weight epoxy ethers are desired ($m>0$), the epoxy forming materials are used in smaller amounts and the ratio varies from about 1:1.1 to 1:2. The term "chemical equivalent" refers to the amount needed to furnish one OH group for every epoxy group.

The desired alkalinity for the bisphenol-epoxy forming material reaction is obtained by adding basic compounds such as sodium or potassium hydroxide, preferably in slight stoichiometric excess (e.g., in excess of one mole of alkali per phenolic OH group) to the reaction mixture. The reaction is preferably conducted by heating the reaction mixture at temperatures between about 50 and 150° C. and more preferably from about 60° to 125° C. Atmospheric, superatmospheric, or subatmospheric temperatures may be utilized as desired.

The water formed in the reaction may be removed during or at the end of the reaction. At the completion of the reaction, the water and excess reactants are preferably removed by distillation, and the residue then treated with an appropriate solvent such as benzene and the solution filtered to remove the salt. The product may then be purified by any suitable method, such as extraction, distillation, etc.

The halobicycloheptenyl bisphenols disclosed above and used to prepare the halogen containing flame retardant glycidyl polyethers are prepared by the condensation of a halo-substituted bicyclic carbonyl of the formula

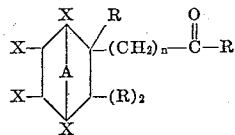

with a phenol in the presence of an acid catalyst. This condensation proceeds under conditions wherein one molecule of the carbonyl condenses with two molecules of phenol in the presence of a sufficient amount of a strong acid as disclosed generally by Martin, The Chemistry of Phenolic Resins (1956) and U.S. Patent Nos. 2,602,821 and 2,602,822. The phenols which may be used in the condensation to prepare the halogen containing bisphenols are those having the formula

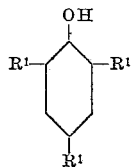

wherein each $R^1$ may be similar or different and are selected from hydrogen 10 and an alkyl having 1 to 12 carbon atoms. Examples include phenol, o- and p-cresol, o- and p-ethylphenol, o- and p-isopropyl phenol, etc; 2,4- and 2,6-dialkyl phenols such as 2,4-xylenol, 2,4-di-tert-butyl phenol, 2-tert-butyl-4-methylphenol, 2,6-di-tert-butyl phenol and the like. The condensation may take place at temperatures between about 45 and 140° C. with between about 45–80° C. being preferred.

The acid catalysts used are preferably strong acids such as HCl, $H_2SO_4$, etc. When HCl is used it is preferably applied in amounts to saturate the solution, although lesser amounts are effective. When $H_2SO_4$ is used the concentration may be varied over a wide range.

The halo-substituted bicyclic carbonyls are prepared by reacting together a tetra- or a hexa-halo-1,3-cyclopentadiene where the halogens are chlorine or bromine with a lower 2-alkenal or alkenone thereby producing a 1:1 adduct. The halo-substituted bicyclic aldehydes and the preparation thereof are disclosed in U.S. Patent No. 2,761,879. The preparation of the corresponding ketones is accomplished by the method described in the example below.

The above described halogen containing glycidyl polyethers are very desirable and valuable flame retardant materials for use in preparing resin products as disclosed herein due to their molecular structure and properties. The halogens of the resin molecule are present only in the halobicycloheptenyl moiety and thereby do not interfere with the functionality of the reactive epoxy groups. The halogen atoms themselves are substantially separated from hydrogen atoms present in the molecule and thus possible reactivity therewith to produce undesirable hydrogen halides which are extremely corrosive is minimized. Additionally, these glycidyl polyethers contain a relatively large number of halogens per molecule thereby providing a high degree of fire retardance per unit weight of resin. It is also found that the resin compositions of the invention have higher heat distortion points than the usual polymers derived from the diglycidyl ether of Bisphenol A.

The other epoxy ethers used in the nonflammable resin composition are the well known glycidyl polyethers derived from reacting a polyhydric phenol with an excess of epoxy-halo-substituted alkane in an alkaline medium. The preferred products are those prepared by reacting epichlorohydrin with a dihydric phenol and have the general formula

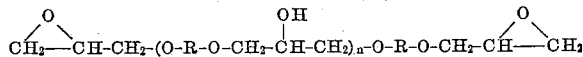

wherein R is a divalent hydrocarbon radical of the dihydric phenol and n is an integer 0, 1, 2, 3, 4, etc. up to about 20 for an individual molecule but an average for the mixture of compounds and is then not necessarily zero or a whole number. Preferred polyhydric phenols which are used include catechol, resorcinol, hydroquinone, methyl resorcinol and especially the dihydroxy diphenylalkanes (bisphenols) such as bis(4-hydroxyphenyl) methane, bis - (4-hydroxyphenyl)ethane, 2,2-bis(4-hydroxyphenyl)propane, 2,2-bis(4-hydroxyphenyl)butane, etc. These glycidyl polyethers and their preparation are more fully described in U.S. Patents 2,633,458 and 2,643,239.

In preparing the flame retardant polyepoxide resin compositions of the invention, the two glycidyl polyethers as set forth above are mixed together and cured. The relative proportion of the two materials is not particularly critical. However, at least 10% of the halogen containing glycidyl polyether must be present in order that the final polymer composition possess the desired fire retardance. Generally, no more than about 80% by weight of the latter is necessary for nonburning resins and from about 10 to 60% by weight is usually adequate. Thus the ratio of halogen containing glycidyl polyether to nonhalogen containing polyether may be between about 4:1 and 1:10, respectively.

The two glycidyl polyethers may be combined by any convenient means since each is compatible with the other in all proportions. Usually one or both of the two components are liquids, and the compositions may be simply prepared by mixing the two together. If one or more of the components are very thick liquids or solids, it is generally preferred to heat them before or during the mixing. Various solvents or diluents which will evaporate before or during cure may be added to assist in the preparation, and are very desirable in preparing films and "wet" lay-up laminates. Suitable solvents include hydrocarbons, such as xylene, benzene, petroleum distillates and the like. It is also convenient in some cases to utilize liquid monoepoxy compounds, such as butyl glycidyl ether, phenyl glycidyl ether, amyl glycidyl ether, allyl glycidyl ether and the like, as well as the lower molecular weight liquid epoxy esters, such as glycidyl acetate, glycidyl acrylate, glycidyl butyrate, and the like. Other materials which are useful as solvents or diluents include the nitriles, such as acetonitrile, acrylonitrile and the like.

The mixtures of the two glycidyl polyethers are cured by the action of a curing agent or hardening agent. Examples of the curing agents include, among others, alkalies like sodium or potassium hydroxide; alkali phenoxides like sodium phenoxide; carboxylic acids or anhydrides, such as phthalic anhydride, tetrahydrothalic anhydric; Nadic methyl anhydride, chlorendic anhydride, pyromellitic anhydride, trimellitic anhydride, succinic anhydride, maleic anhydride, octadecenylsuccinic anhydride, etc., and mixtures thereof; dimer or trimer acids derived from unsaturated fatty acids, 1,20-eicosanedioic acid, and the like; Friedel-Crafts metal halides, such as aluminum chloride, zinc chloride, ferric chloride, or boron trifluoride as well as complexes thereof with ethers, acid anhydrides, ketones, diazonium salts, and those disclosed in U.S. 2,824,083; salts such as zinc fluoborate, magnesium perchlorate, zinc fluosilicate; phosphoric acid and partial esters thereof, including n-butyl orthophosphate, diethyl ortho-phosphate and hexaethyltetraphosphate aliphatic, aromatic and heterocyclic amino compounds, such as, for example, diethylene triamine, triethylene tetramine, tetraethylene pentamine, dicyandiamide, melamine, pyridine, cyclohexylamine, benzyldimethylamine, benzylamine, diethylaniline, triethanolamine, piperidine, tetramethylpiperzine, N,N-dibutyl-1,3-propane diamine, N,N-diethyl-1,3-propane diamine, 1,2-diamino-2-methyl-propane, 2,3-diamino-2-methylbutane, 2,4 - diamino-2-methylpentane, 2,4-diamino-2,6-diethyloctane, dibutylamine, dioctylamine, dinonylamine, distearylamine, diallylamine, dicyclohexylamine, methylethylamine, ethylcyclohexylamine, pyrrolidine, 2-methylpyrrolidine, tetrahydropyridine, 2,6-diaminopyridine, diaminodiphenylmethane, P,P'-aminodiphenylsulfone, triaminobenzene, ortho-, para-, and metaphenylene diamine, methylene dianiline, diaminotoluene, diamio-diphenyl, diamino-stilbene, 1,3-diamino-4-isopropyl benzene, and the like, and soluble adducts of amines and polyepoxides and their salts, such as described in U.S. 2,651,589 and U.S. 2,640,037. Also included are the amino-amides obtained by reacting polybasic acids with polyamines such as described in U.S. Patents 2,450,940, and 2,695,908.

Preferred curing agents are the polycarboxylic acids and their anhydrides, the primary and secondary aliphatic cycloaliphatic, aromatic and heterocyclic amines, and preferably the polyamines and adducts of amines and epoxides.

The amount of the curing agent employed will vary depending upon the type of agent selected. In general, the amount of the curing agent will vary from about 0.5% to 200% by weight of the combined mixture of the glycidyl polyethers. The tertiary amines and $BF_3$ complexes are preferably employed in amounts varying from about 0.5% to 20% and the metal salts are preferably employed in amounts varying from about 1% to 15%. The secondary and primary amines, acids and anhydrides are preferably employed in at least .6 equivalent an equivalent amount being that sufficient to furnish one active hydrogen atom or carboxyl group or anhydride group for every epoxy group. Such combinations are preferably combined in equivalent ratios (curing agent to epoxy) which vary from about .6:1 to 1.5:1. Where the anhydride curing agents are used, it is often desirable to add small amounts of a promotor to hasten the cure (0.1–5% by weight of the total composition). Suitable promotors include tertiary amines such as benzyldimethylamine, octoates such as stannous and zinc octoate, alkyl sulfides, phosphines such as triphenyl phosphines, quaternary ammonium salts, etc.

The curing of the above-described compositions to form the desired flame retardant, insoluble infusible products may be accomplished by merely mixing the above-noted curing agents in the desired amounts with the compositions of the present invention and heating. Curing temperatures range generally from room temperature to about 250° C. the exact range depending on the curing agent selected. The most active curing agents, such as the polyamines like diethylene triamine, are reactive at lower temperatures, such as from room temperature to about 60° C. Less active materials such as polybasic anhydrides and acids generally require temperatures from about 60° to about 150° C. Other agents, such as the aromatic polyamines are cured preferably at temperatures from about 60° C. to as high as about 250° C.

The compositions of the invention may be utilized for a variety of applications. Because of their flame retardance as well as hardness and impact resistance when cured, the compositions are ideally suited for use in preparing coating compositions, foams, pottings, castings, adhesives, impregnating compositions for cloth and paper, and the like.

When used for coating compositions, the new compositions of the invention may be mixed with solvents or diluents, additives, such as plasticizers, stabilizers and extenders such as oils, resins, tars, pitches, distillates and the like, and then combined with the desired curing agent. The coatings prepared in this manner may be allowed to set hard at room temperature or heat may be applied to hasten the cure.

The products of the invention may also be used in preparing non-flammable pottings and castings for electrical apparatus. In actual practice, the compositions are generally combined with the desired curing agent and the mixture poured into the mold or casting containing the electrical apparatus, such as electrical motors and the like, and the mixture allowed to set. Heat may also be applied to hasten cure.

The resinous products may also be employed to prepare valuable flame retardant foamed products. In this application the resinous products of the invention are preferably combined with the desired curing agents and foaming agents and others, such as thixotropic agents, pigments, stabilizing agents and the like. This mixture may be foamed and cured by allowing to stand or by applying heat.

The resin products of the invention may also be used to prepare valuable adhesives and impregnating compositions. In utilizing the products for these applications it is generally desirable to combine them with the desired curing agent and any suitable solvent or diluent such as acrylonitrile, acetonitrile, crotonitrile, and desired fillers and stabilizers and then apply this mixture to the desired surface. Adhesive compositions prepared in this manner may be used to unite various surfaces such as wood-to-wood, metal-to-metal, resins-to-resins and the like. The adhesives may be allowed to set at room temperature or heat may be applied to hasten the cure.

To illustrate the manner in which the invention may be carried out, the following examples are given. It is understood, however, that the examples are for the purpose of illustration and the invention is not to be regarded as limited to any of the specific compounds and conditions recited therein. Unless otherwise specified, parts disclosed in the examples are given by weight.

EXAMPLE I

*Preparation of hexahalobicycloheptadiene bisphenols*

Phenol (1200 g.) and 1,2,4,5,6,7,7-hexachlorobicyclo (2.2.1)-5-heptene-2-carboxaldehyde (194.9 g.) were combined in a flask in the presence of HCl gas and heated to 50° C. for a few hours and then to 80–90° C. for a similar time. The unreacted phenol was removed by distillation. The product (292 g.) (92% of theory) was then recovered and extracted with n-heptene, filtered and dried. The resinous product was identified as bis(hydroxyphenyl) - [(1,4,5,6,7,7 - hexachlorobicyclo(2.2.1) - 5-heptene-2-)]-methane.

*Preparation of the diglycidyl polyether of the bisphenol*

Into a 2000 ml. reaction vessel were placed 150 g. of the bisphenol prepared above, 600 grams of epichlorohydrin, 180 g. methanol and 40 g. water. The mixture was heated to reflux (76° C.) at which time a 50% aqueous solution of sodium hydroxide was rapidly added. The mixture was then refluxed for approximately ½ hour after which time the excess epichlorohydrin was removed. The contents of the reaction vessel were then cooled to 100° C. and 600 ml. of methyl isobutyl ketone and 500 ml. of 5% aqueous sodium hydroxide solution were added. This mixture was then refluxed for ½ hour after which time the aqueous phase was separated from the organic phase and the latter washed first with 500 ml. of monobasic sodium phosphate and then with 500 ml. water. 162 grams of the solid glycidyl polyether was obtained which had the following analysis:

Chlorine _____ 34.7 (calc. 34.8).
Epoxide equivalent/100 g. _____ 0.310 (calc. 0.328).
Molecular weight _____ 620±20 (calc. 611).

The above preparation of the bisphenol was repeated except that the carbonylic compound 4(1,4,5,6,7,7-hexachlorobicyclo-(2.2.1)-5-heptene-2) butan-2-one and having the formula

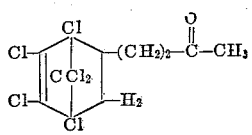

and prepared by reacting equimolar amounts of hexachlorocyclopentadiene and 5-hexen-2-one at 135° C. for 4 hours according to the method described in J. Amer. Chem. Soc., 76, 2709–10 (1954) was substituted for the aldehyde. The bisphenolic product was identified as 2,2-bis(hydroxyphenyl)-4 - [(1,4,5,6,7,7 - hexachlorobicyclo (2.2.1)-5-heptene-2-)]butane.

The above prepared bisphenol was then converted to the corresponding diglycidyl ether by the same procedure

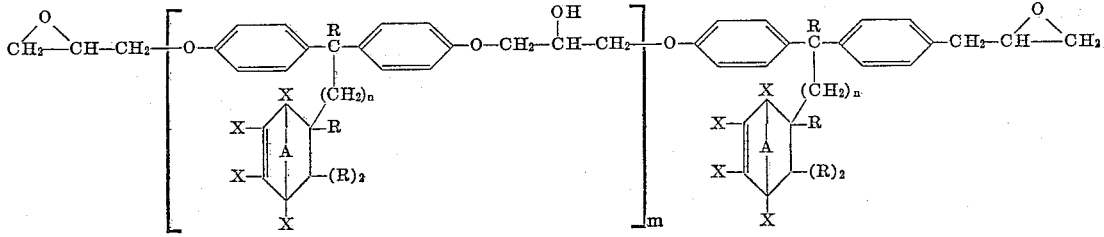

described above. The resulting resin had the following analysis:

Chlorine, percent _____ 29.8 (calc. 32.6).
Epoxide equivalent/100 g. _____ 0.282 (calc. 0.307).
Molecular weight _____ 642±20 (calc. 652).

*Preparation of the cured resins*

To 100 parts of a mixture of 50% each of the diglycidyl polyethers prepared above and 50% of Epon 828 (Shell Chemical Company) liquid glycidyl polyether prepared by reacting epichlorohydrin with 2,2-bis(4-hydroxyphenyl)propane and having the following properties:

Avg. molecular weight (approx.) _____ 380
Hydroxyl content, equiv. OH/100 g. _____ 0.06
Epoxide equivalent/100 g. _____ 0.52–0.55 and having the formula was added 11 parts of meta-phenylene diamine. The mixture was thoroughly blended and heated for 1 hour at 100° C. and then for 24 hours at 180° C. The cured resins obtained were hard, inflexible materials having a heat distortion point of 190–195° C. The resins were tested according to ASTM–D635–63 and were found to be fire retardant.

EXAMPLE II

The above curing procedure was repeated with the substitution of a mixture of 40 parts of Nadic methyl anhydride (Allied Chemical Company) and 1 part of benzyldimethylamine as the curing agents. The cured resins contained 25% chlorine and would not support a flame. The heat distortion point of the resins was 180–185° C.

By comparison 100 parts of Epon 828 cured with the same stoichiometric amount of meta-phenylene diamine (14 parts) as set forth in the examples above and cured by the same method had a heat distortion point of 150–160° C. and was not flame retardant.

I claim as my invention:

1. A flame retardant epoxy resin composition comprising a mixture of from 10 to about 80% by weight of a glycidyl polyether having the formula wherein each R is independently selected from the group consisting of hydrogen and a lower alkyl, X is selected from the group consisting of chlorine and bromine, A is selected from the group consisting of —$CH_2$— and $CX_2$—, n is an integer from 0 to 6 and m is an average number between 0 and 4, and from about 20 to about 90% by weight of a glycidyl polyether having the formula

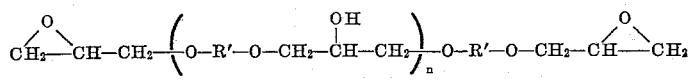

where R' is a divalent hydrocarbyl radical of a dihydric phenol and n is an average number between 0 and 20.

2. The composition of claim 1 wherein R' is the divalent hydrocarbyl radical of Bisphenol A.

3. A flame retardant polymer composition comprising a cured mixture from 10 to about 80% by weight of a glycidyl polyether having the formula

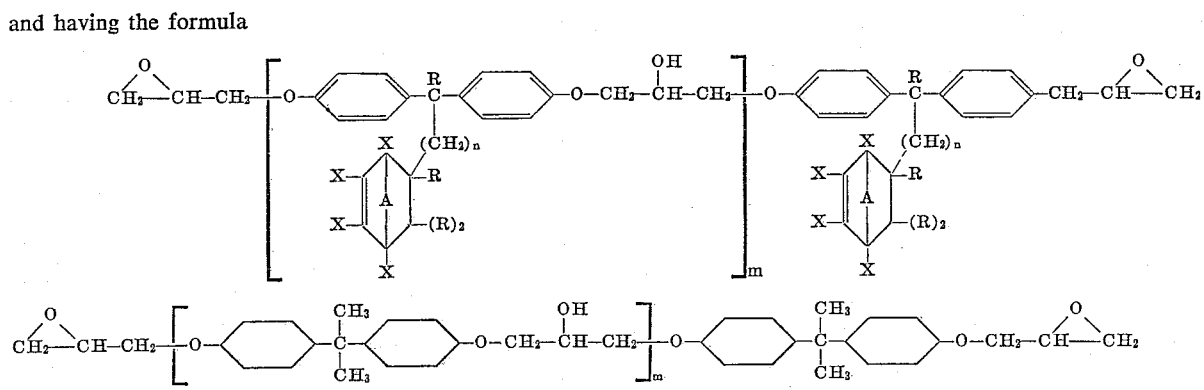

where each R is independently selected from the group consisting of hydrogen and a lower alkyl, X is selected from the group consisting of chlorine and bromine, A is selected from the group consisting of —$CH_2$— and —$CX_2$—, n is an integer from 0 to 6 and m is an average number between 0 and 4, and from about 20 to about 90% by weight of a glycidyl polyether having the formula
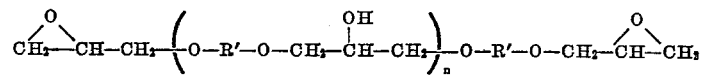
where R' is a divalent hydrocarbyl radical of a dihydric phenol and $n$ is an average number between 0 and 20.
No references cited.
GEORGE F. LESMES, *Primary Examiner.*
M. TILLMAN, *Examiner.*
P. LIEBERMAN, *Assistant Examiner.*